United States Patent [19]

Blazek

[11] 3,891,146

[45] June 24, 1975

[54] PIPELINE APPARATUS

[75] Inventor: George A. Blazek, Hinsdale, Ill.

[73] Assignee: Advance Value Installations Inc., Hinsdale, Ill.

[22] Filed: Sept. 12, 1973

[21] Appl. No.: 396,510

[52] U.S. Cl. .............................................. 138/94.3
[51] Int. Cl. ............................................ F16l 29/00
[58] Field of Search ............ 138/44, 45 A, 94, 94.3, 138/94.5; 251/327, 329; 137/583, 584; 285/121

[56] References Cited
UNITED STATES PATENTS

| | | | |
|---|---|---|---|
| 647,739 | 4/1900 | Barrett........................... | 138/94 UX |
| 2,014,682 | 9/1935 | Greene ................................. | 138/44 |
| 2,031,151 | 2/1936 | Eulberg......................... | 138/45 A X |
| 2,050,544 | 8/1936 | Robinson et al...................... | 138/44 |
| 2,354,967 | 8/1944 | Perry .............................. | 138/94.3 |
| 2,896,668 | 7/1959 | Aitken............................ | 138/94.3 X |

*Primary Examiner*—Charles A. Ruehl
*Attorney, Agent, or Firm*—Morris Spector

[57] ABSTRACT

A high pressure pipeline having an economical fitting which makes it possible to carry out certain functions without shutting down the pipeline. Certain installations may require many such fittings. Each fitting requires an operating mechanism for operating it. The operating mechanism may be a rather expensive apparatus. In one embodiment of the invention the operating mechanism is attached to the operated structure for only short periods of time and then disconnected therefrom, leaving the operated structure in its functioning condition in relation to the pipeline. Thus a single operating mechanism may be used for operating each of a number of different structures or fittings from time to time as required. The fitting has a seat for temporarily seating the operating mechanism onto the fitting while the fitting is under pressure for performing various equipment changes or other operations of the fitting.

12 Claims, 19 Drawing Figures

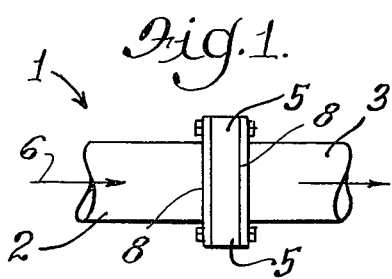
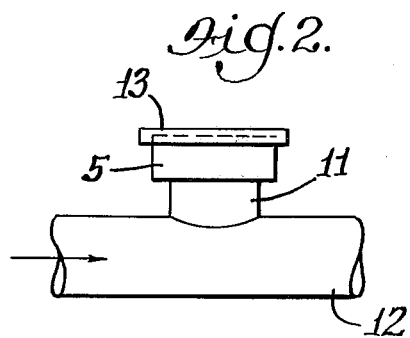
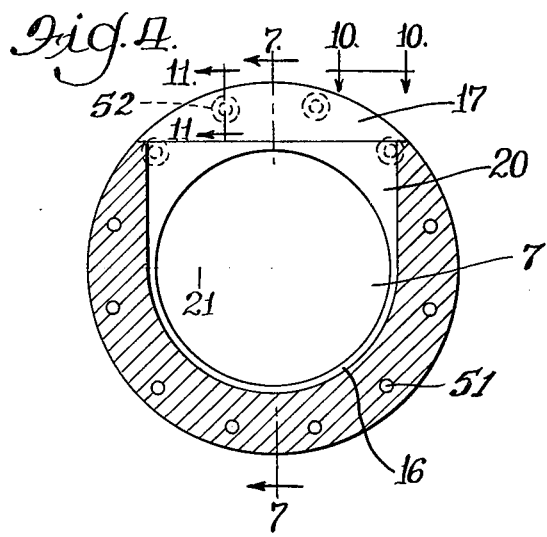
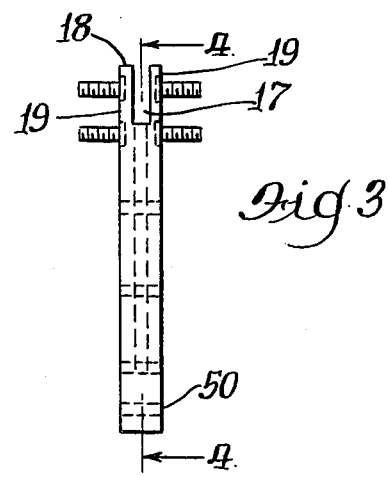
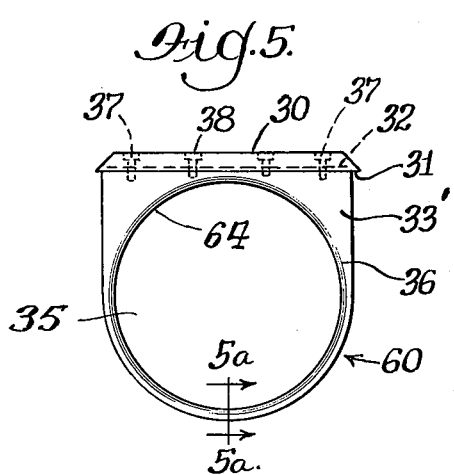
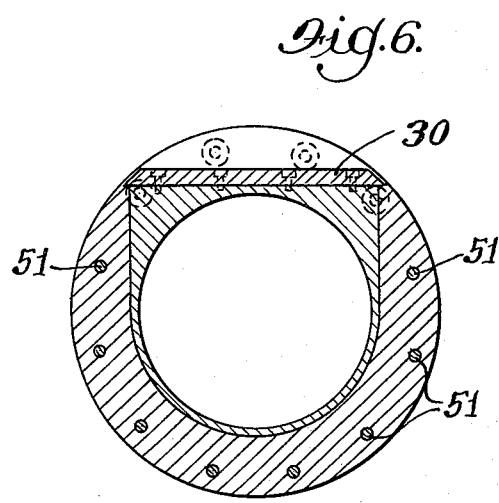
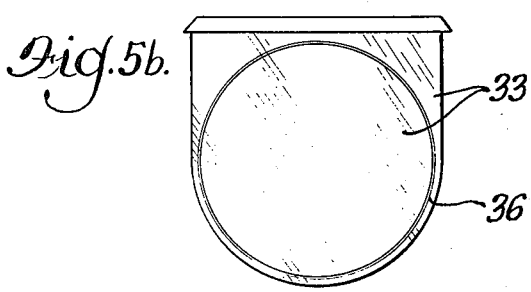
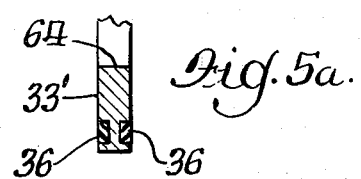

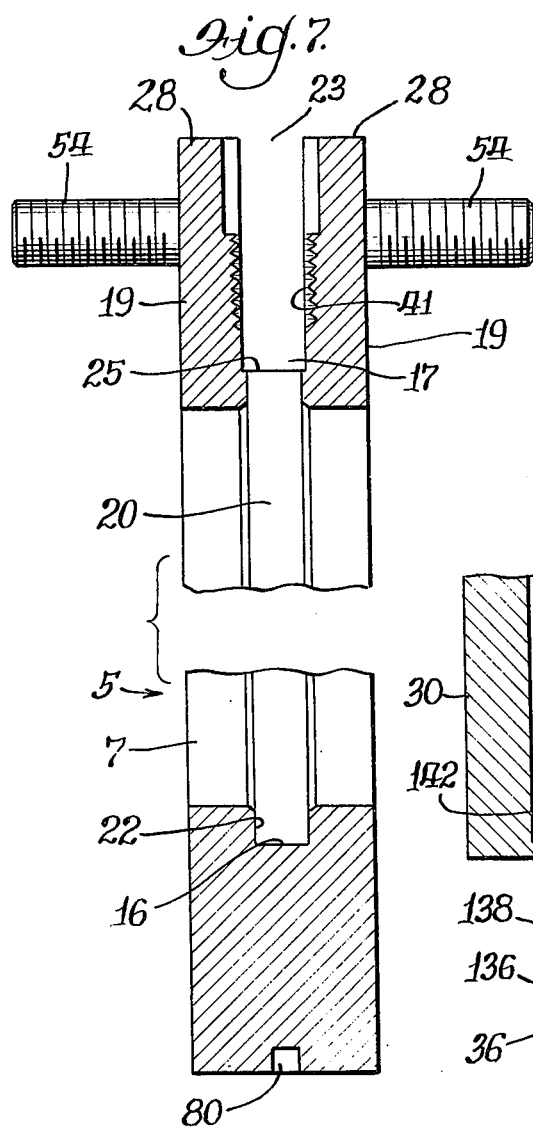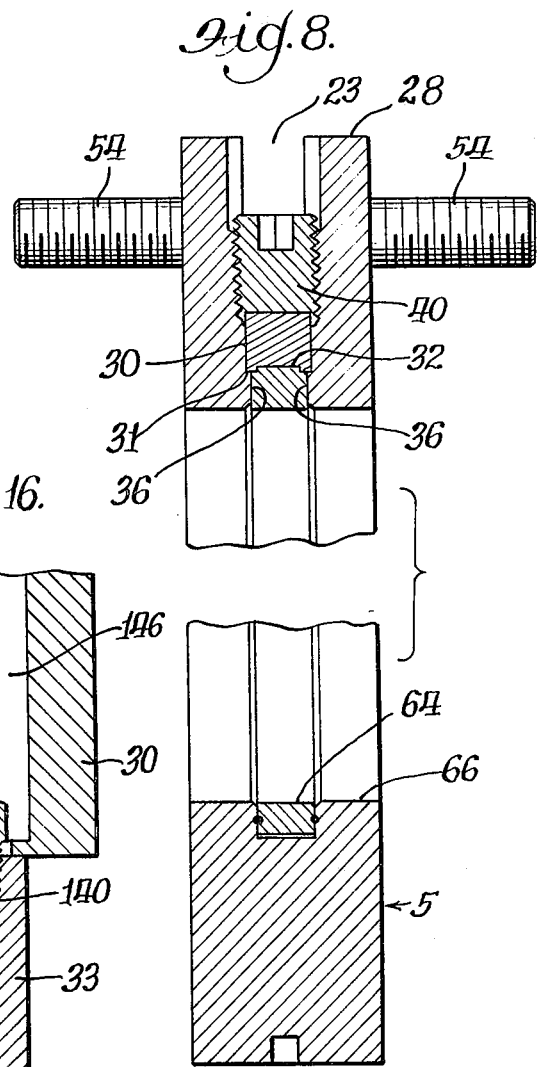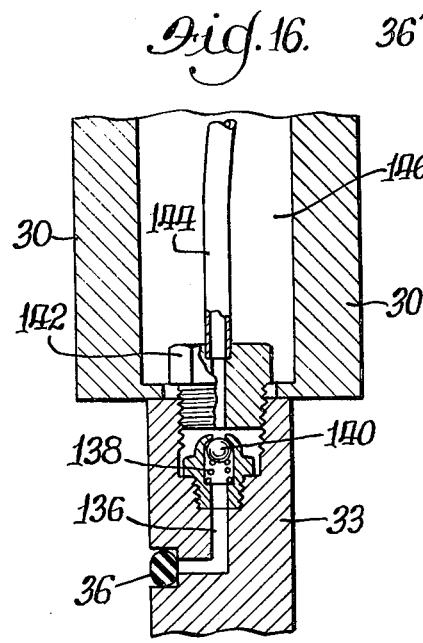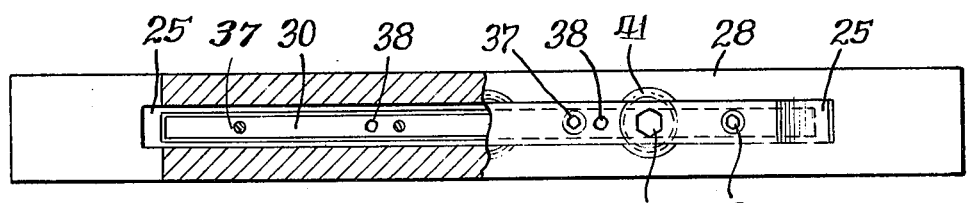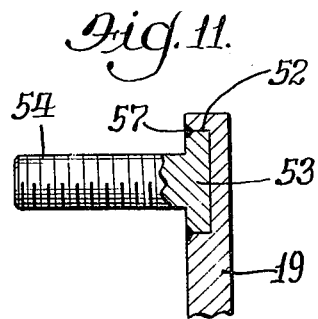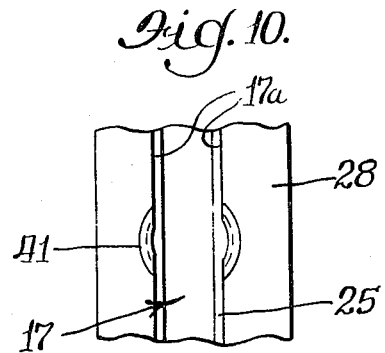

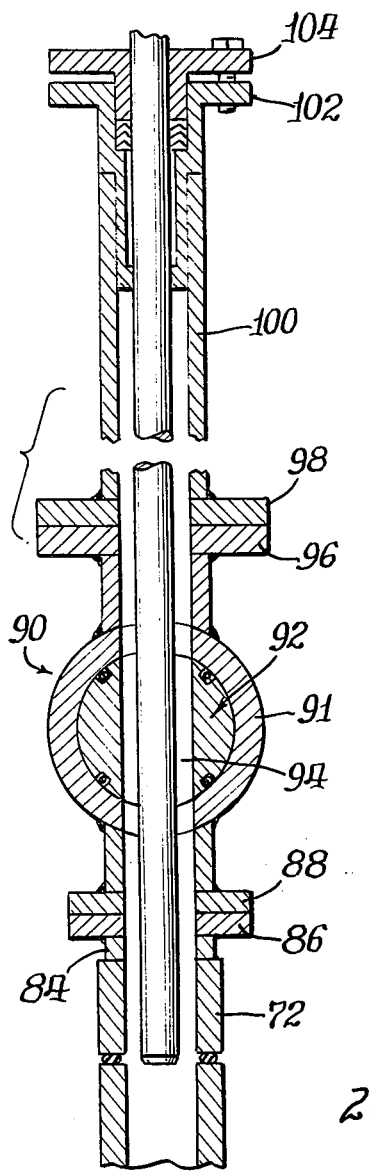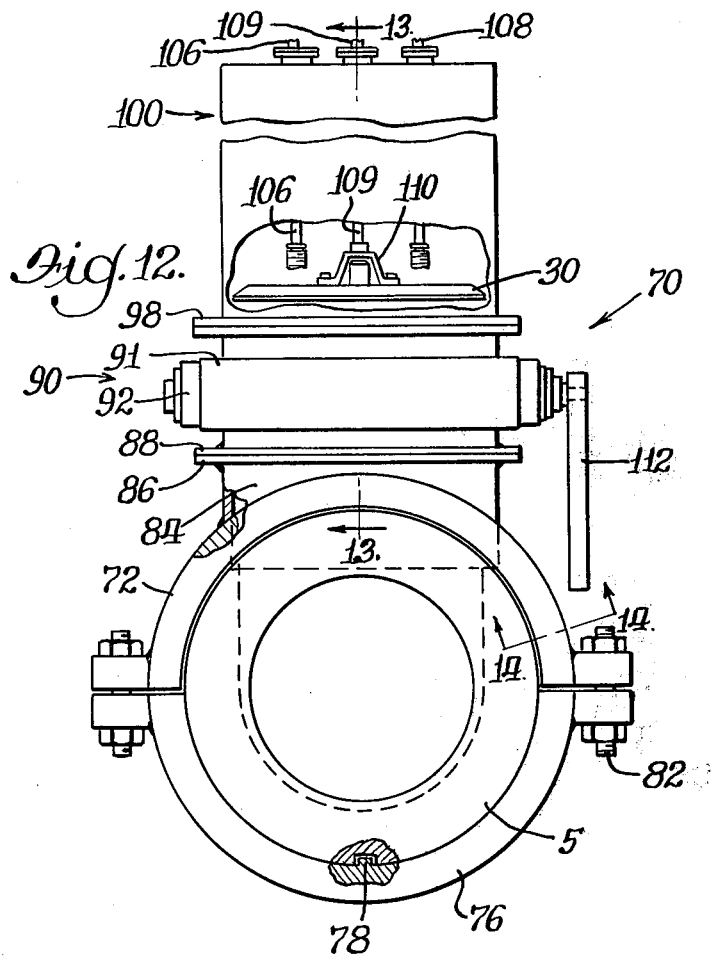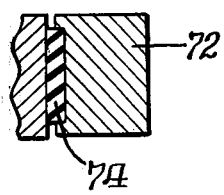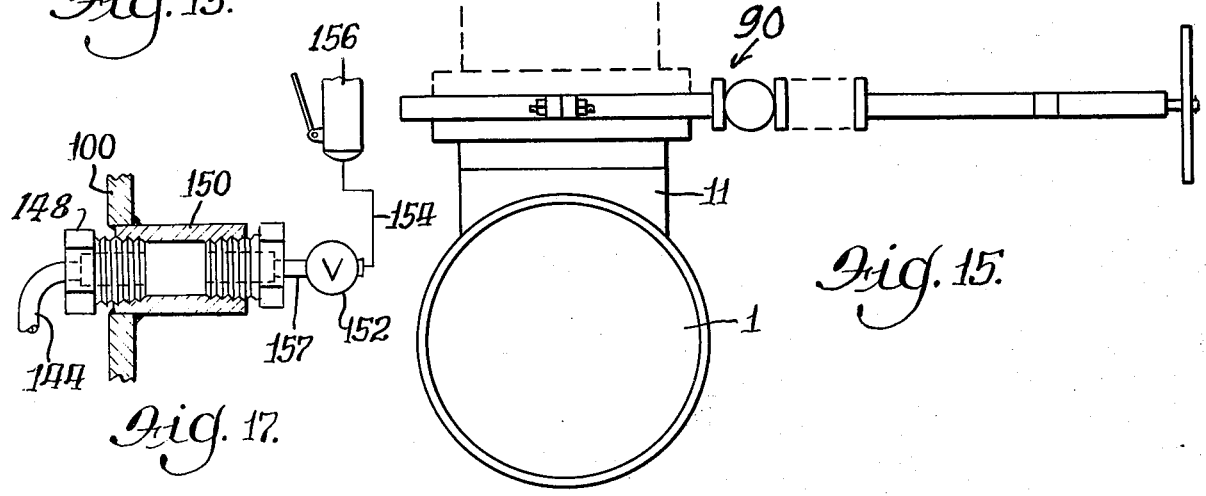

PIPELINE APPARATUS

OBJECTS OF THE INVENTION

In high pressure pipeline systems, such as for instance, high pressure oil pipelines or high pressure gas pipelines, it is often necessary to install a valve while the system is in operation without interrupting the operation of the system. Such valves are expensive and it is, therefore, desirable to avoid the installation of such valves where the need is only problematical. Frequently, the valve when needed is one wherein the operation from open to closed position or from closed to open position takes place infrequently, perhaps more than a decade between operations. It is an object of this invention to provide a fitting of the above-mentioned character which is comparatively cheap in construction and can be converted from an open to a closed position or visa versa, when need for such conversion arises. The fitting may be installed in a pipeline main at the time the pipeline is laid, leaving the flow-through passageway of the fitting open. There is a seating surface on the fitting that is capable of receiving a completion device, which, when applied, permits opening of the fitting to make the necessary insertion and then the periphery of the fitting is reclosed to permit removal of the completion device, all in a simple and efficient manner.

It is a further object of this invention to provide a fitting of the above-mentioned character that can be connected to a pipeline during initial installation of the pipeline or after the pipeline has been installed and is in service, which fitting is left in its closed position to be opened at some future time when and if a branch connection is made to the pipeline through the fitting.

THE DRAWINGS

The attainment of the above and further objects of the invention will be apparent from the following specifications taken in conjunction with the accompanying drawings forming a part thereof.

FIG. 1 is a fragmentary view of a portion of a pipeline in which a fitting of the present invention is installed.

FIG. 2 is a view of a portion of an installation wherein the fitting of the present invention is installed in a branch of a pipeline.

FIG. 3 is an end view of a fitting of the present invention.

FIG. 4 is a sectional view taken along the line 4—4 of FIG. 3.

FIG. 5 is a face view of a keep-clean ring and cover plate that is mounted in the fitting of FIG. 3.

FIG. 5a is a fragmentary section taken along the line 5a—5a of FIG. 5. FIG. 5b is a view corresponding to FIG. 5 showing a closure plate.

FIG. 6 is a section similar to FIG. 4 showing the keep-clean ring in position.

FIG. 7 is an enlarged sectional view taken along the line 7—7 of FIG. 4.

FIG. 8 is a view similar to that of FIG. 7, but showing the keep-clean ring in position.

FIG. 9 is a top plan view of FIG. 7, partially broken away.

FIG. 10 is an enlarged plan view taken along the line 10—10 of FIG. 4.

FIG. 11 is a sectional view taken along the line 11—11 of FIG. 4.

FIG. 12 is a front view of a completion device as applied to a fitting of the present invention;

FIG. 13 is a sectional view taken along the line 13—13 of FIG. 12;

FIG. 14 is a fragmentary section taken along the line 14—14 of FIG. 12;

FIG. 15 is a diagramatic view illustrating the manner of mounting the fitting of the present invention on a line while it is under pressure;

FIG. 16 is an enlarged fragmentary view showing a modified form of closure plate and the connection thereto for pressurizing the seal and FIG. 17 is a fragmentary view showing a pressuring attachment at the upper end of the bonnet of FIG. 12.

DESCRIPTION

Reference may now be had more particularly to the drawings wherein like reference numerals designate like parts throughout.

In FIG. 1 there is shown a pipeline 1 that includes two pipe sections 2 and 3, joined by a fitting 5 of the present invention. The flow passageway of the pipe sections 2 and 3 is indicated at 6, the fitting having a flow passageway therethrough, which is aligned with and of the same internal diameter as that of the pipe sections. The pipe sections and the fittings are joined in any conventional manner, as for instance by providing the pipe section with peripheral flanges 8—8 that seat against opposite sides of the fitting and are secured thereto by bolt and nut means. The fitting 5 of FIG. 1 is connected in the pipeline at the time the pipeline is installed, and may serve merely to receive a blocking plate to block the passageway as the line is being constructed, or to provide the potential of inserting a blocking plate in the future, should it be desired to block fluid flow between the pipe section 2 to the pipe section 3. After the pipeline is installed and put into use, the fitting can be converted from one purpose to another without interruption of the pipeline pressure, as will be explained as this description proceeds.

In FIG. 2 the fitting 5 as illustrated is installed in a branch 11 of a high pressure pipeline 12. The fitting of FIG. 2 may be installed during the initial laying of the pipeline or it may be installed when the pipeline is in service and under pressure. It may be installed as part of branch from the pipeline, or installed as part of a future branch to be extended from the pipeline. In the latter case, the fitting is installed with a removable blocking plate in place, blocking off the flow-through passageway that extends through the fitting, and if desired, a removable cover cap 13 is positioned on the end of the fitting of FIG. 2 to be removed when the connections are made from the pipeline 12 through the fitting. Thereafter, the plate that blocks the fluid flow passageway in the fitting can be removed as desired, without interrupting the pressure of the fluid in the pipeline 12.

A description will now be given of the construction of the fitting 5. The fitting comprises a flange that is adapted to be connected in a pipeline as between the two pipe sections 2 and 3, and includes the flow-through passageway 7, (FIG. 7) which is of the same diameter as the internal diameter of the pipe sections 2–3. The inner surface of the passageway 7 of the fitting has a groove or channel 16 formed therein which extends through 180° and is centered on the same center as the center of the flow-through passageway 7. The fitting also has a slot 17 therethrough that extends from the peripherial surface of the fitting to a depth short of reaching the flow-through passageway 7. It has another channel 20 extending from the slot 17 transversely of the passageway 7 to the diametrical line 21 where it merges with the sidewalls 22 of the channel 16, to provide an opening 23 through which a blocking plate or other piece of equipment can be inserted through the periphery of the flange to a position within the flow passageway 7 and, if desired, restrict or even close that passageway. This opening is surrounded by a flat seating surface 25 for seating a closure bar. A completion device receiving seating surface 28 surrounds the surface 25 for a completion device to be seated thereon and permit the insertion into and retracting from the fitting of various equipment that may at different times be positioned therein.

The surface 25 provides a seat for a closure bar that seals the peripheral opening in the flange. This closure bar carries the particular equipment that is to be inserted into the passageway through the flange for specific purposes intended. The closure bar indicated at 30 is shown more particularly in FIGS. 5, 6 and 9. The bottom of the bar has a flat surface 31 that has a rectangular depression 32 in the bottom thereof that constitutes a seating and centering cavity for equipment that is to be suspended therefrom. The suspended equipment illustrated in FIG. 5b comprises a closure plate 33 that has on each side thereof a peripheral groove in each of which is placed a sealing 0-ring gasket 36. The closure plate is suspended from the closure bar by four screws 37 that extend downwardly through counter bores in the closure bar and thread into the closure plate. In addition, the closure bar has two tapped bores 38 extending downwardly from the top thereof, but not entirely through it, for receiving screws that attach to it a retracting mechanism for lowering the bar into position or retracting it from position with respect to the flanges. When the bar 30 is seated in position between the opposite walls of the slot 17, it may be locked in place by a number of lock screws 40 of which three are shown, each of which threads into interrupted threads 41 formed in the opposite surfaces 17a–17a of the slot 17. The threads are formed by first drilling each of the holes with a flat bottom drill and then tapping the bores. The screws 40 are flat bottomed (FIG. 8). They bear against the top surface of the closure bar 30 and thus press the closure bar firmly on the seat 25 of the fittings.

The pipe sections 2–3 are secured to the opposite sides of the fitting 5 by eight bolts 51 that extend thru corresponding through-holes 50 in the flange. No through-holes can extend through the flange at the places where such holes would intersection with slots 17 or channel 20. In order to fasten the pipe sections to the flange at those places, special means are provided. For this purpose the outside surface of each sector of the 19–19 is drilled to form four circular cavities 52 (FIGS. 4 and 11) that receive circular heads 53 of bolts 54 axially from the flange. The shanks of the bolts 54 extend The bolts heads 53 are welded to the flange as indicated at 57. These four shanks and the eight through-holes 51 are placed 30° apart and serve to receive nuts or bolts, as the case may be, for securing the pipe sections 2 and 3 to opposite sides of the flange.

When the through-passageway 7 in the flange is to be maintained open, the closure plate 33 is replaced by a plate 33 similar thereto, but having a circular opening 35 therein of the same size as the through-passageway in the pipe sections 2–3. This plate is illustrated in FIG. 5 and 6 and constitutes a keep-clean ring 60. It is secured to the closure bar 30 in the same manner as the closure plate 33 is secured thereto as previously described. It fills the channel 16 in the fitting, thereby preventing or reducing chemical action of the pipe fluid with the seating surface of the channel, or depositing of debris therein which might remain in place and prevent proper seating of a closure plate 33 of FIG. 5b when an attempt is made to move such a closure plate into position. The keep-clean ring preferably has an 0-ring similar to the 0-ring 36 on one or both sides thereof. The inside diameter of the keep-clean ring, indicated at 64, is preferably of the same diameter as the inside surface 66 of the flow-through passageway in the fitting 5. This prevent turbulence in the flow of fluid through the pipeline, of which the fitting 5 is a part.

The keep-clean plate may be made to serve an additional function where that is desired. To that effect, the inside surface of the keep-clean plate may be of an inside diameter appreciably less than the diameter of the inside of the pipeline of the flow-through passageway so that it forms an affirmative control orifice opening where an orifice opening is desired. It may be desired if throttling of the pressure in the pipeline is sought. It may be desired as an adjunct to measuring instruments that measure the drop in pressure of fluid flowing through the orifice plate as a function of measurement of the velocity of flow. FIG. 5A would then be a section through such orifice plate where the determined diameter 64 is the desired amount less than the determine diameter of the pipeline.

A description will now be given of the pass-through completion device that may be used to insert or remove the closure bar 30 for the purpose of removing or changing one of the structural parts carried thereby, as in the case of a keep-clean ring, closure plate, orifice plate, or the like. This apparatus comprises a pass-through completion device 70 that has at one end thereof a mounting saddle 72 that is adapted to rest on the fitting 5. The mounting saddle 72 has a sealing gasket 74 on its inner surface, said gasket resting in a depression in the mounting saddle as is apparent from FIG. 14. The saddle 72 is slotted at its upper end corresponding to the slot at the top of the fitting. A lower saddle 76 bolts to the upper saddle to lock the completion device to the fitting 5. The holding saddle 76 has a centering pin 78 that cooperates with a circular centering hole 80 in the fitting 5 for orienting the pass-through completion device with respect to the fitting. Bolts 82 lock the two saddle portions onto the fitting, thus locking the completion device properly in place. Welded to the saddle 72 there is an upper saddle weldment 84 which forms a rectangular bonnet terminating at its upper end in a seat flange 86 to which is bolted the lower flange 88 of a pass-through valve or gate 90 that includes an outer cylindrical wall 91 in which is journaled a pass-through valve stem 92 that has a slot 94 therein of a sufficient length and width to permit the passage therethrough of the closure bar 30 and parts carried thereby, with adequate clearance. The valve 90 terminates in a top flange 96 on which seats and is bolted a flange 98 of a completion bonnet 100 that terminates at its upper end in a flange 102 to which is bolted a cover 104. Operating tools 106, 108 and a pull rod 109 pass through the cover 104 into the bonnet.

The tools 106 and 108 may be manipulated from outside the bonnet 100 to unthread and retract the respective lock screws 40 to release the closure bar 30. The pull rod 109 carries at its lower end a bracket 110 that is adapted to connect with the closure bar 30 so that the pull rod 109 can be lifted to pull the cover bar 30 from the fitting 5 through the open valve 90 into the bonnet 100. When this has been done, the valve 90 may then be moved to its closed position as by a handle 112. This retains the pressure in the fitting 5 while permitting removal of the bonnet 100 from the valve 90 to remove the bar 30 and the plate connected thereto, for replacement of the plate that has been connected to the bar 30, or for replacement by a different bar 30 carrying a different plate. When the change has been made, the bonnet 100 may then be restored on the pass-through valve 90. Thereafter the valve 90 may then be opened, and by going through the same procedure in reverse, the new plate with its closure bar 30 may be lowered through the pass-through valve 90 into the fitting 5 and locked in place. Thereafter the pass-through completion device 70 may be removed from the fitting.

In the description hereafter given, the closure plate 33 carries its gasket 36 which protrudes sufficiently to form the necessary seal. This entails rubbing and possible searing of the sealing gasket 36 when the plate is being inserted or removed. Sometimes it is desired to have an enormous pressure of the gasket ring in order to provide a through sealing. The avoidance of the scoring or the attainment of the high gasket pressure may be accomplished by using the system described in my co-pending application serial number 396,509 filed of even date herewith entitled PIPELINE CLOSURE AND METHOD. Essentially it consists of providing means for pressurizing the 0-ring gasket 36. This is done by providing a port 136 to the channel in which the gasket 36 lies (FIG. 16), which port 136 leads to a grease pressure fitting 138. The fitting 138 including a spring-pressed ball check 140. A nut 142 is threaded into the end of the plate 33, which nut has welded thereto a flexible tube 144. This flexible tube extends through an opening 146 in the bar 30 and is extended through the pass-through device 90 and terminates within the bonnet 100. The flexible tube 144 terminates in a grease fitting in the bonnet 100 as is illustrated in FIG. 17 and is further described in my above identified application. The flexible tube 144 terminates in a coupling 150 that is welded to the bonnet 100 or to the cover thereof. The coupling 150 is internally threaded as indicated to receive a proper fitting 148 at the end of the flexible tube 144 or other apparatus that may be similarly connected to the plate 33. At its opposite end, the coupling 150 is threaded to receive a pipe connection 157 leading to a manually operable valve 152 that may be releasably connected by a tube 154 to the outlet from a manually operable pressure grease gun 156 so that when the valve 152 is shut, the tube 144 is closed at the corresponding end thereof, and when the valve 152 is open, it communicates with the grease gun 156 for transmitting grease under pressure through the tube 144 to and through the ball check valve 140 to expand the 0-ring into sealing engagement. When it is desired to remove the plate from the fitting, it is necessary first to release the grease pressure. This is done by depressing the ball 140 of the check valve of FIG. 16. This is accomplished by substituting for the nut 142 a similar nut having a flexible cable attached thereto that contains a flexible wire, of the "Bowden" type of releasing cable, and extending the "Bowden" cable through the pass-through valve and the completion bonnet to the fitting 150 where it is connected as illustrated in my above referred to application Ser. No. 369,569.

FIG. 15 shows the means of connecting the fitting of the present invention to an existing pipeline under pressure. The branch pipe 11 is welded to the pipe of the pipeline 1 while the pipe is still intact. The fitting 5 is connected to the branch pipe 11. At this time the fitting 5 lacks the closure bar 30 and its associated plate. The pass-through completion device 70 that includes the pass-through valve or gate 90 is assembled with the fitting 5 in the manner heretofore explained, the pass-through device containing within its bonnet 100 the necessary bar 30 and closure plate assembled therewith and ready for insertion into the fitting 5. An apparatus 200 is connected to the fitting 5 as shown. This apparatus is of a type known in the art. It makes a sealing fit with the fitting 5 and includes a pass-through valve and a boring tool for cutting a hole in the pipe 1 and extracting the slug therefrom all while the pipe 1 is under pressure. After extraction of the slug from the pipe 1, the pass-through valve or gate 90 is operated in the manner heretofore described to insert the closure plug and to insert and lock the bar 30 in position within the fitting 5, all as heretofore described. Thereafter the pass through completion device 70 that includes the pass-through valve 90 is removed and the apparatus 200 is removed. If the branch line 11 is not to be used immediately, a temporary cover may be provided thereon. At this time the branch is closed by the fitting 5 and when it is desired to make an extension therefrom, the cover on the fitting is removed and an extension pipe is connected thereto, all while the line is under pressure. The fitting 5 is quite cheap in comparison with the cost of a pass-through valve and may be used as a valve in the future if that is desired or, if a butterfly valve or other type of valve is desired, that may be attached in addition to the comparatively low cost fitting 5.

What is considered new and sought to be secured by letters patent are:

1. A fitting for a pressure pipe system, said fitting comprising a body having a flow passageway extending therethrough and having a slot thru the wall thereof for movement of a member into the body in a direction substantially at right angles to the flow passageway, a closure bar for closing the slot, means for releasably securing the bar in position closing the slot in the body, said body having a surface constituting a seat for an operating unit for performing mechanical operations within the fitting by access thereunto through the slot, said surface surrounding the slot and the closure bar and the bar securing means so that when the unit is on said surface and secured to the fitting the bar securing means may be released and together with the bar retracted from the slot while maintaining the fitting under pressure in the pipe system, to permit insertion or removal of such member by a movement thru the slot into or out of the body while the body is under pressure.

2. A fitting a defined in claim 1 wherein said closure bar includes means for releasably securing said member to it.

3. A fitting as defined in claim 2 wherein said member comprises a plate for closing said flow-passageway.

4. A fitting as defined in claim 1 wherein the passageway is cylindrical and the slot extends crosswise of the flow passageway and through a distance at least equal to the diameter of the passageway.

5. A fitting of claim 4 in combination with a structure for facilitating making changes within the fitting while it is carrying pressure, said structure including a chamber having a mounting portion which includes means making a sealing fit with said seating operating unit receiving surface on the fitting and surrounding, but being spaced from said closure bar and the said closure bar securing means, said structure including a bonnet and including gate means joining the mounting portion to the bonnet, the gate means being movable from a closed position where it seals the bonnet from the mounting portion to an open position sufficiently large to permit movement of said closure bar therethrough into the bonnet, and means movable through the open gate for manipulating the closure bar attaching means.

6. An annular pipe fitting for connection between adjacent pipes of a pressure pipeline and having a axial fluid flow passageway therethrough, a plate-like member in the fitting and extending across the passageway, a slot in the wall of the fitting for insertion and retraction of the plate member from the fitting while the fitting is part of a pipeline, a cover for the slot, the plate member being secured to the cover, means for releasably securing the cover in place, in combination with a completion device having (a) a seating portion adapted to seat on the annular surface of the fitting in a position surrounding the cover and the cover securing means but spaced therefrom, (b) a bonnet, and (c) a pass-through gate connecting the bonnet with the seating portion of the completion device; means for locking the seating portion on said annular surface with a fluid-tight seal between them and surrounding the slot and the gate and being sufficiently large to permit the cover and the plate member to pass therethrough, and means extending through the bonnet and the gate for operating the cover securing means and moving the cover through the gate, whereby to enable the removal and replacement of the cover and plate member while the line is under pressure.

7. Apparatus as defined in claim 6 wherein the fitting is cylindrical and the completion device is mounted on the cylindrical portion of the fitting.

8. Apparatus as defined in claim 6 wherein the bonnett is of sufficient size to receive the plate member so that upon replacement of a cover over said slot the completion device including the gate may be removed, leaving the fitting as a pass-through fitting in the pressure pipe line.

9. A pipe fitting comprising a body having a substantially circular hole therethrough, and means for facilitating holding successive parts of a pipeline against the opposite ends of the body with the hole constituting a continuation of the fluid-flow passageway between the pipeline parts, a slot shaped opening formed in the body as right angle to the fluid-flow passagement therethrough and a length of the order of the diameter of the hole and extending from outside of the body to said hole and intersecting the hole to the extent of the order of 180° of the hole, and means forming a closure for said slot opening, said last means comprising means forming a sealing seat around the periphery of the slot openings and a closure bar movable in the slot towards the sealing seat to seat thereon and close the slot opening.

10. A fitting of claim 9 that includes bar securing means for clamping said bar towards said seat.

11. A fitting of claim 10 wherein said body has a surface constituting a seat for an operating unit for performing mechanical operations within the fitting by access thereunto through the slot, said surface surrounding the slot and the closure bar and the bar securing means so that when the unit is on said surface and secured to the fitting the bar securing means may be released and together with the bar retracted from the slot.

12. A fitting of claim 11 in combination with a structure for facilitating making changes within the fitting while it is carrying pressure, said structure including a chamber having a mounting portion which includes means making a sealing fit with said operating unit receiving surface on the fitting and surrounding, but being spaced from said closure bar and the said closure bar securing means, said structure including a bonnet and including gate means joining the mounting portion to the bonnet, the gate means being movable from a closed position where it seals the bonnet from the mounting portion to an open position sufficiently large to permit movement of said closure bar therethrough into the bonnet, and means movable through the open gate for manipulating the closure bar securing means.

* * * * *